(12) United States Patent
Williams

(10) Patent No.: US 6,517,251 B1
(45) Date of Patent: Feb. 11, 2003

(54) OVERMOLDED MOTOR BEARING AND METHOD OF MAKING SAME

(75) Inventor: Mark D. Williams, Hampstead, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 09/710,552

(22) Filed: Nov. 9, 2000

Related U.S. Application Data

(60) Provisional application No. 60/165,164, filed on Nov. 12, 1999.

(51) Int. Cl.[7] ............................................. F16C 27/00
(52) U.S. Cl. ....................................... 384/536; 384/488
(58) Field of Search ................................. 384/536, 488; 29/898.049, 898.04, 898.054, 898.07, 898.12; 264/242, 247, 272.11, 272.2

(56) References Cited

U.S. PATENT DOCUMENTS

| | | | |
|---|---|---|---|
| 2,986,432 A | | 5/1961 | Schlauch |
| 3,415,500 A | | 12/1968 | Pethis |
| 3,424,508 A | | 1/1969 | Kizer et al. |
| 3,495,887 A | | 2/1970 | Hay |
| 4,017,128 A | | 4/1977 | Setele et al. |
| 4,229,055 A | | 10/1980 | Olschewski et al. |
| 4,603,025 A | * | 7/1986 | Landay et al. ............... 264/242 |
| 4,668,110 A | | 5/1987 | Egeto et al. |
| 4,758,101 A | | 7/1988 | Roof, Sr. et al. |
| 4,848,938 A | | 7/1989 | Haas et al. |
| 4,854,751 A | | 8/1989 | Grassmuck et al. |
| 4,908,922 A | * | 3/1990 | Abe ............................ 264/229 |
| 5,038,460 A | * | 8/1991 | Ide et al. ................... 264/272.2 |
| 5,161,903 A | | 11/1992 | March |
| 5,295,744 A | | 3/1994 | Petrzelka et al. |
| 5,728,343 A | * | 3/1998 | Ueno .......................... 264/242 |
| 5,943,776 A | * | 8/1999 | Wolfe et al. ................... 29/509 |
| 5,961,222 A | * | 10/1999 | Yabe et al. .................. 384/476 |

* cited by examiner

Primary Examiner—Christopher P. Schwartz
Assistant Examiner—Xuan Lan Nguyen
(74) Attorney, Agent, or Firm—Harness, Dickey & Pierce, P.L.C.

(57) ABSTRACT

An overmolded motor bearing is provided for use with an electric motor. A conventional ball-bearing has a rubberized sleeve molded directly onto the bearing so that the bearing and insulating rubber sleeve form a unitary subassembly. The bearing sub-assembly is formed by inserting the conventional ball-bearing directly into the mold of an injection molding machine. Importantly, the rubberized material encapsulating the bearing extends around the outer bearing race and along the side faces of the bearing. In a preferred embodiment, separate nylon washers are installed on either side of the bearing when the bearing is inserted into the mold. The rubberized material is then injection molded around the outer bearing race to capture the nylon washers. The preferred embodiment thus prevents the bearing shields on the side faces of the bearing from being subjected to the injection molding pressures within the mold which can deform and thus damage the bearing shields.

11 Claims, 2 Drawing Sheets

OVERMOLDED MOTOR BEARING AND METHOD OF MAKING SAME

This application claims the benefit of provisional application No. 60/165,164, filed Nov. 12, 1999.

BACKGROUND AND SUMMARY OF THE INVENTION

The present invention relates to bearings for electrically powered devices and in particular to a bearing for supporting the armature shaft of a motor in a power tool that is double-insulated to meet applicable safety standards.

Conventional motor bearings for power tools are typically inserted into rubber boots or sleeves before installation of the bearing into the power tool housing. The rubber boot serves two primary functions: (i) it electrically insulates the motor armature shaft from the power tool housing and adjoining metal components of the motor, and (ii) provides vibration damping of the motor. However, installation of the motor bearings into the rubberized sleeves is a time consuming, manual process. Therefore, it is desirable to provide a unitary bearing assembly that can be directly installed on the motor armature shaft.

The present invention proposes a conventional ball-bearing that has a rubberized sleeve molded directly onto the bearing so that the bearing and insulating rubber boot form a unitary subassembly. To accomplish this objective, the bearing is inserted directly into the mold and the rubberized material is injection molded around the bearing. Importantly, the rubberized material encapsulating the bearing extends around the outer bearing race and along the side faces of the bearing. In a preferred embodiment, separate nylon washers are installed on either side of the bearing when the bearing is inserted into the mold. The rubberized material is then injection molded around the outer bearing race to capture the nylon washers. The preferred embodiment thus prevents the bearing shields on the side faces of the bearing from being subjected to the injection molding pressures within the mold which can deform and thus damage the bearing shields.

DETAILED DESCRIPTION OF THE PREFERRED EMBODIMENTS

Figure 1:
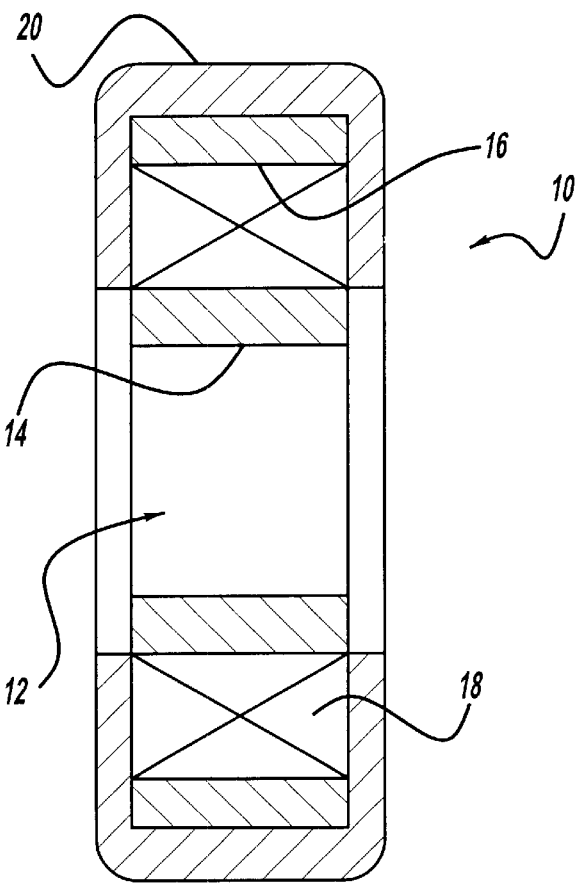
FIG. 1 is a sectional view of a first embodiment of a bearing assembly according to the present invention.

Referring to FIG. 1, a sectional view of a first embodiment of a motor bearing assembly 10 according to the present invention is shown. The motor bearing assembly 10 comprises a conventional ball bearing subassembly 12 having an inner race 14, an outer race 16, and a plurality of balls 18 captured therebetween. The inner race 14 of the bearing 12 is adapted to be fitted onto the armature shaft of a motor (not shown), and the entire bearing assembly is intended to be mounted in the tool housing so that the armature shaft of the motor is rotationally supported relative to the tool housing. Encapsulating the outer bearing race 16 and extending along the side faces of the bearing 12 is an integrally molded sleeve or boot 20 which, in the preferred embodiment, is made of a synthetic rubber material. The rubber boot 20 is formed around the bearing 12 by inserting the bearing directly into a suitably shaped mold of an injection molding machine. The synthetic rubber compound injected into the mold encapsulates the bearing as shown so that the resulting bearing assembly comprises a unitary assembly that increases assembly efficiency of the bearings onto the motor armature shaft and then into the tool housing.

Importantly, the overmolded rubberized material is formed around the bearing along its side faces so as to extend substantially to the inner race 14 of the bearing 12. This is required to ensure that the bearing assembly meets applicable safety standard for double insulated electrical appliances, such as a.c. power tools. In order for the rubber overmold 20 to extend along the side faces of the bearing 12 as shown, it is necessary for the side faces of the bearing to be exposed to the internal mold pressures associated with the injection molding process. For motor bearings having bearing shields between the inner 14 and the outer 16 races to keep ball grease in and dirt and debris out, the pressures of the injection molding process may damage the bearing shields.

Figure 2:
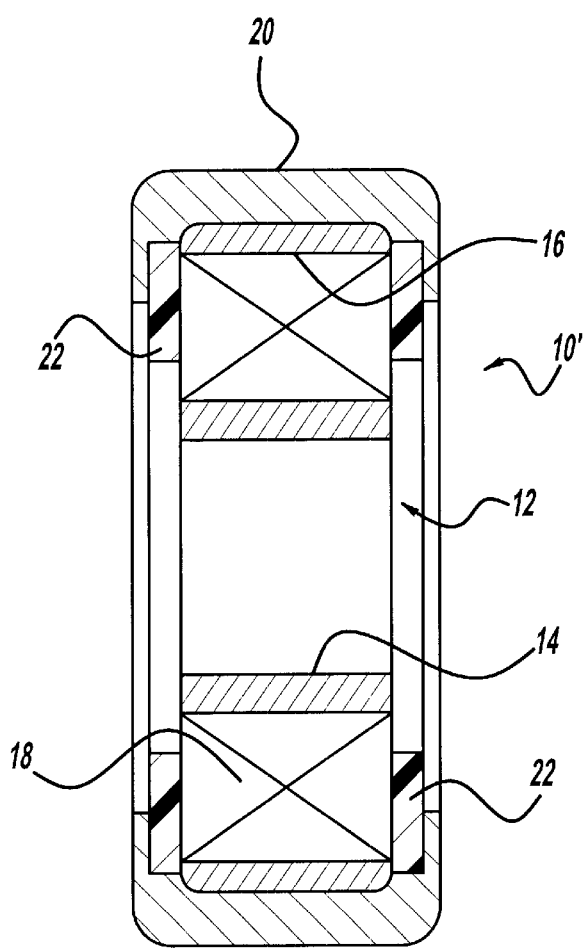
FIG. 2 is a sectional view of a second preferred embodiment of a bearing assembly according to the present invention.

To address this potential problem, an alternative preferred embodiment of the present overmolded bearing assembly 10' is shown in FIG. 2. In the embodiment shown in FIG. 2, the overmolded rubberized material 20 extends only around the sides of the outer race 16 a distance sufficient to capture a pair of plastic washers 22 located on either side of the bearing. The plastic washers 22, which are preferably made of a synthetic hard plastic material such as nylon, have an outer diameter substantially equal to the diameter of the outer race 16 and a radial dimension that extends substantially to the inner race 14 of the bearing 12. To manufacture the bearing assembly 10', the plastic washers 22 are placed on either side of the bearing 12 when positioned in the mold. The synthetic rubber compound 20 is then molded around the bearing 12 so as to completely cover the outer race 16 and capture the washers 22 to hold them in place. Significantly, it is not necessary in this embodiment for the overmolded rubber material to extend significantly along the side faces of the bearing 12. Thus, the bearing shields are not subjected to the internal pressures of the mold and therefore are protected from damage. The plastic washers 22 nonetheless serve to electrically insulate the side faces of the bearing from the surrounding metallic components of the motor as required to meet applicable safety standards for double-insulated electrical appliances.

Figure 3:
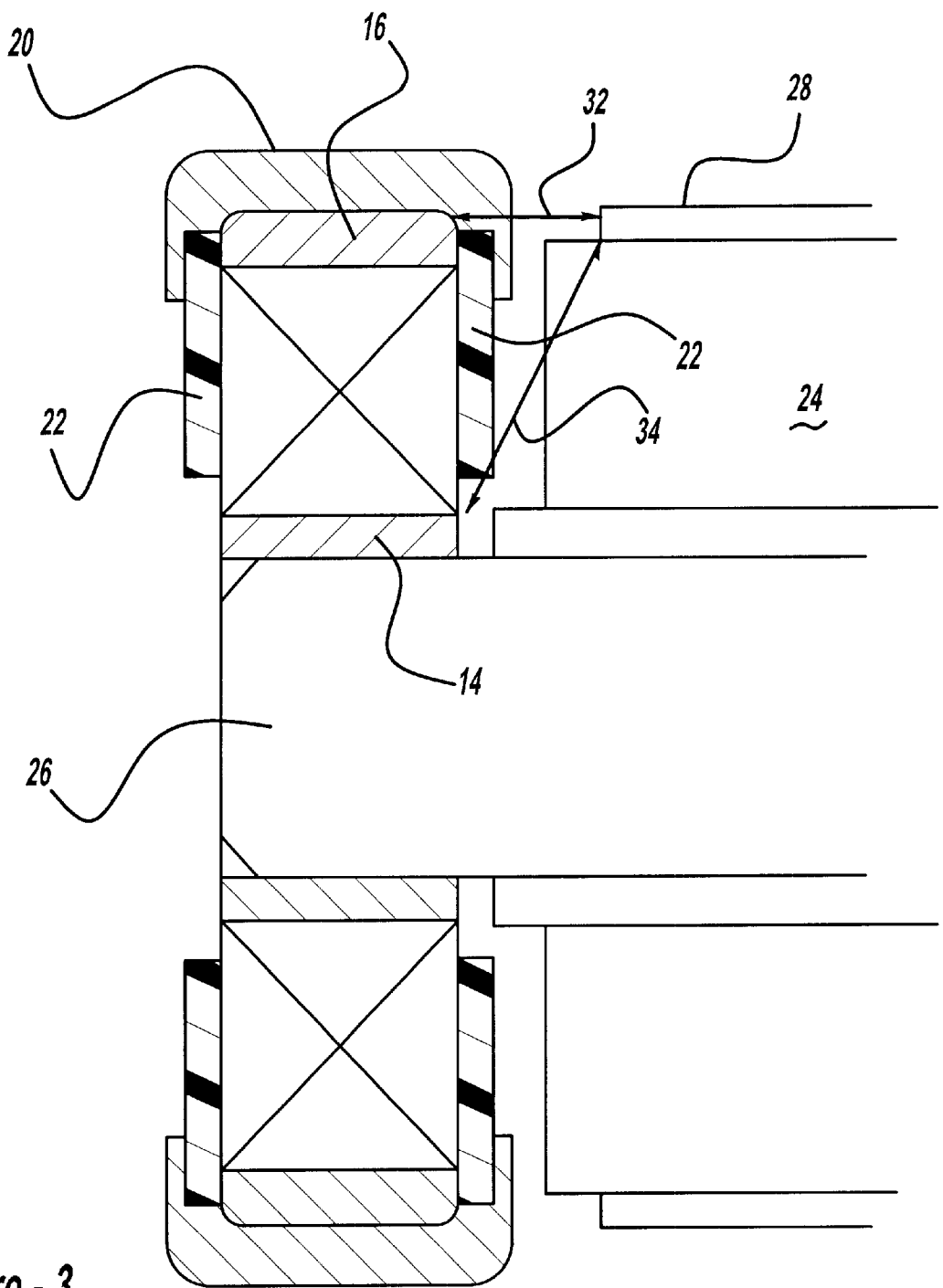
FIG. 3 is an enlarged partial section view of the preferred embodiment o the bearing assembly shown in FIG. 2 and illustrated on the end of the armature shaft of a motor.

With particular reference to FIG. 3, an enlarged sectional view of the bearing assembly 10' located on the armature shaft 26 of a motor 24 is shown. As demonstrated in the drawing, the presence of the plastic washers 22 ensures that the required current path through air between the motor bearing 12 and the adjacent commutator bar 28 of the motor 24 meets applicable safety standards for double-insulated electrical appliances. In a preferred embodiment, the current path without the insulating sleeve as shown at 32 is approximately 5 mm; whereas the current path for the overmolded bearing assembly in accordance with the present invention as shown at 34 exceeds 8 mm as required by the known U.L. standard. While the above description was provided with reference to the U.L. safety standard, it readily understood that the principles embodied in the present invention may be used to meet a variety of applicable safety standards.

Thus, it will be appreciated that an integrally overmolded bearing assembly for rotationally supporting the armature shaft of an electric motor is shown that eliminates the need for installing a separate rubber boot onto the bearing to meet the safety requirements of double-insulated electrical appliances. Moreover, because the bearing assembly includes an integrally overmolded rubberized boot, the assembly problems associated with installing a separate boot onto the bearing and then preventing the bearing from becoming separated from the boot during assembly of the bearing into the tool housing are avoided.

What is claimed is:

1. A method for manufacturing an overmolded motor bearing; comprising the steps of:

providing a ball bearing sub-assembly having an outer race, an inner race, and a plurality of balls captured therebetween;

placing the ball bearing sub-assembly into a mold of an injection molding machine;

positioning an insulating washer adjacent to the outer race of the bearing sub-assembly, the insulating washer having an inner radial surface and an outer radial surface, such that the inner radial surface of the insulating washer extends towards the inner race along a side face of the bearing sub-assembly; and injecting an insulating material into the mold, whereby an insulating sleeve encapsulates the outer race and a portion of the outer radial surface of the insulating washer, such that the insulating sleeve affixes the insulating washer against the outer race of the bearing sub-assembly but does not extend over the remainder portion of the outer radial surface of the insulating washer, thereby forming an overmolded motor bearing.

2. The method of claim 1 wherein the insulating washer includes an outer diameter substantially equal to the diameter of the outer race and a radial dimension that extends substantially to the inner race of the bearing sub-assembly.

3. The method of claim 1 wherein the insulating washer is made of a synthetic plastic material.

4. A method for assembling an electric motor, comprising the steps of:

placing a ball bearing sub-assembly into an injection molding machine, the bearing sub-assembly having an outer race, an inner race, and a plurality of balls captured therebetween, where the inner race is adapted to be fitted onto an armature shaft of the electric motor;

positioning an insulating washer adjacent to the outer race of the bearing sub-assembly, the insulating washer having an inner radial surface and an outer radial surface, such that the inner radial surface of the insulating washer extends towards the inner race along a side face of the bearing sub-assembly;

molding an insulating sleeve onto the ball bearing sub-assembly, whereby the insulating sleeve encapsulates the outer race and a portion of the outer radial surface of the insulating washer, such that the insulating sleeve affixes the insulating washer against the outer race of the bearing sub-assembly but does not extend over the remainder portion of the outer radial surface of the insulating washer; and fitting the inner race of the bearing sub-assembly onto the armature shaft of the electric motor.

5. The method of claim 4 wherein the insulating washer includes an outer diameter substantially equal to the diameter of the outer race and a radial dimension that extends substantially to the inner race of the bearing sub-assembly.

6. The method of claim 4 further comprising placing the electric motor into an electric power tool.

7. The method of claim 4 wherein the insulating washer is made of a synthetic plastic material.

8. An overmolded motor bearing for use with an electric motor, comprising:

a ball bearing sub-assembly having an inner race, an outer race, and a plurality of balls captured therebetween;

an insulating washer positioned adjacent to the outer race of the bearing sub-assembly, the insulating washer having an inner radial surface and an outer radial surface, such that the inner radial surface of the insulating washer extends towards the inner race along a side face of the bearing sub-assembly; and an insulating sleeve integrally overmolded to the ball bearing sub-assembly, where the insulating sleeve encapsulates the outer race and a portion of the outer radial surface of the insulating washer, such that the insulating sleeve affixes the insulating washer against the outer race of the bearing sub-assembly but does not extend over the remainder portion of the outer radial surface of the insulating washer.

9. The motor bearing of claim 8 wherein the insulating washer includes an outer diameter substantially equal to the diameter of the outer race and a radial dimension that extends substantially to the inner race of earing sub-assembly.

10. The motor bearing of claim 8 is fitted onto an armature shaft of the electric motor and the electric motor is incorporated into an electric power tool.

11. The overmolded motor bearing of claim 8 wherein the insulating washer is made of a synthetic plastic material.

* * * * *

UNITED STATES PATENT AND TRADEMARK OFFICE
CERTIFICATE OF CORRECTION

PATENT NO. : 6,517,251 B1
DATED : February 11, 2003
INVENTOR(S) : Mark D. Williams It is certified that error appears in the above-identified patent and that said Letters Patent is hereby corrected as shown below:

<u>Title page, Item [54] and Column 1, lines 1 and 2,</u>
Delete "AND METHOD OF MAKING SAME"

<u>Column 4,</u>
Line 41, "earing" should be -- the bearing --.

Signed and Sealed this

Nineteenth Day of August, 2003

JAMES E. ROGAN
*Director of the United States Patent and Trademark Office*